United States Patent [19]

Wagner

[11] Patent Number: 5,165,347
[45] Date of Patent: Nov. 24, 1992

[54] VEHICLE LEVITATION AND GUIDANCE SYSTEM

[76] Inventor: Thomas V. Wagner, 10339 Zelzah Ave., #44, Northridge, Calif. 91326

[21] Appl. No.: 692,158

[22] Filed: Apr. 26, 1991

[51] Int. Cl.⁵ .............................................. B60L 13/10
[52] U.S. Cl. ..................................... 104/283; 104/305; 104/DIG. 1; 446/129; 446/444; 105/1.5
[58] Field of Search ............ 104/281, 283, 290, 305, 104/DIG. 1; 105/1.5; 446/129, 134, 230, 444, 445, 446, 449

[56] References Cited

U.S. PATENT DOCUMENTS

| | | | |
|---|---|---|---|
| 482,957 | 9/1892 | Allen | 446/444 |
| 1,318,708 | 10/1919 | Turner | 446/430 |
| 3,189,981 | 6/1965 | Genin et al. | 446/129 |
| 3,641,704 | 2/1972 | Sims et al. | 446/429 |
| 3,820,472 | 6/1974 | Schwarzler | 104/290 |
| 4,178,707 | 12/1979 | Littlefield | 446/129 |
| 4,455,783 | 6/1984 | Nagano | 446/446 |
| 4,486,729 | 12/1984 | Lee | 446/134 |
| 4,504,012 | 3/1985 | Fetty et al. | 238/10 F |
| 4,852,497 | 8/1989 | Tsui | 104/283 |

Primary Examiner—Robert J. Oberleitner
Assistant Examiner—Kevin D. Rutherford
Attorney, Agent, or Firm—Freilich Hornbaker Rosen

[57] ABSTRACT

A vehicle levitation and guidance system (20) is provided which levitates a vehicle (22) over a roadbed (28) through the use of thin permanently magnetized strips (32, 34) located in the vehicle and the roadbed. The strips are oriented with like magnetic poles adjacent to generate a repelling force. The vehicle is guided along the roadbed by sliding engagement of the walls (37) of a channel (30) in the roadbed with pins (36) descending from the vehicle. The vehicle is propelled along the roadbed by contact with a set of rotating wheels (42, 42').

10 Claims, 3 Drawing Sheets

VEHICLE LEVITATION AND GUIDANCE SYSTEM

FIELD OF THE INVENTION

The present invention pertains to vehicles and more particularly, to levitation and guidance systems particularly suited for use with small scale models of vehicles such as trains, cars, etc.

BACKGROUND OF THE INVENTION

The prior art is replete with various types of vehicle levitation and guidance systems. Although such systems may find application in specific environments, they are generally too complex and expensive for use in small scale model systems primarily used for entertainment.

SUMMARY OF THE INVENTION

The present invention is directed to a simple and inexpensive system for levitating a vehicle over a roadbed and guiding the vehicle along the roadbed.

Systems in accordance with the invention are characterized by the disposition, in both the vehicle and roadbed, of thin magnetic strip material permanently magnetized parallel to its thin dimension. The respective vehicle and roadbed strips are oriented to repel one another thus levitating the vehicle over the roadbed.

In a preferred embodiment of the invention, a thin flexible permanent magnetic strip is attached to the bottom of a vehicle. A similar magnetic strip is mounted within the roadbed parallel to the vehicle magnetic strip. The magnetic strips are permanently magnetized parallel to their thin dimension. and oriented with each other to have like magnetic poles adjacent thereby creating a force which levitates the vehicle above the roadbed. One or more pins descends from the vehicle and extends into a longitudinal channel in the roadbed for guidance of the vehicle. Propulsion means, e.g. a rotating wheel arranged adjacent to the roadbed to contact the vehicle sides, imparts a propelling force to the vehicle.

The propelling force may be supplied by alternative mechanisms such as a resilient spring arranged adjacent to the roadbed, a motor driven wheel disposed in the vehicle to contact the roadbed, or a current carrying coil disposed in the vehicle to interact with a magnetic field adjacent the roadbed.

Although embodiments of the invention are particularly suited for use in small scale models used for entertainment, e.g. model train sets, the invention may also find advantageous application in full scale systems.

The novel features of the invention are set forth with particularity in the appended claims. The invention will be best understood from the following description when read in conjunction with the accompanying drawings.

DETAILED DESCRIPTION

Figure 1:
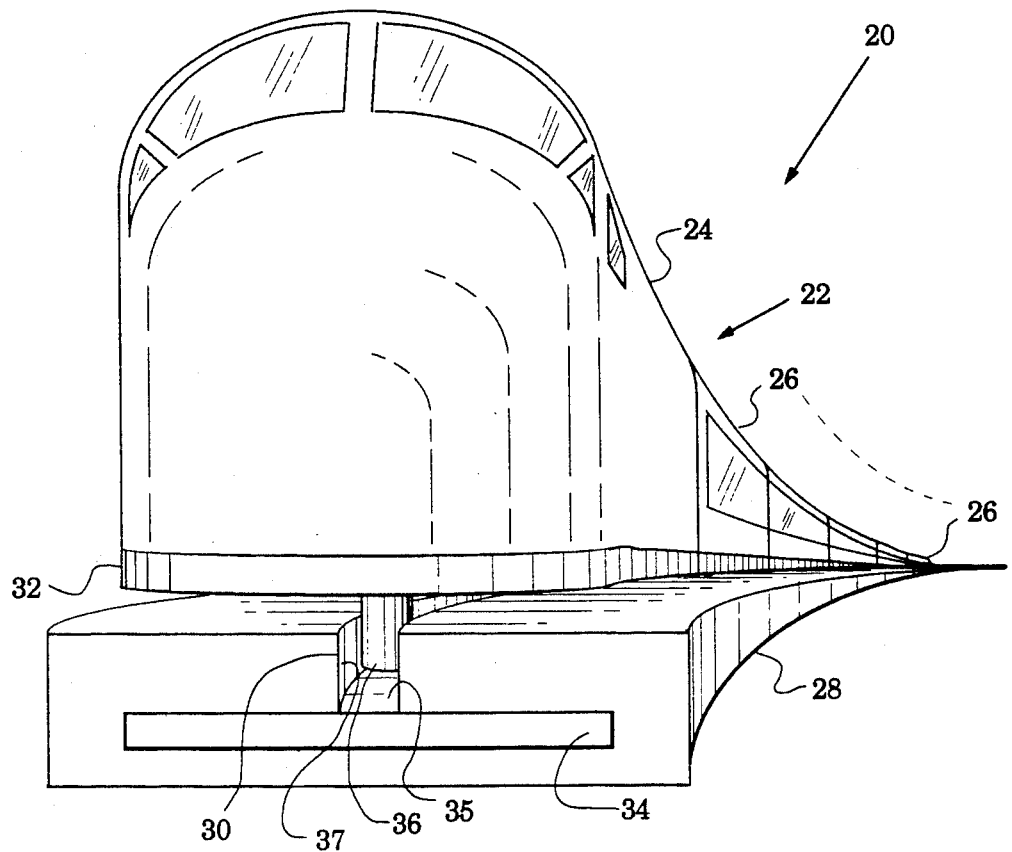
FIG. 1 is a perspective view of a preferred embodiment, in accordance with the present invention, of system for levitating and guiding a vehicle along a roadbed.

FIG. 1 is a perspective view of a preferred embodiment of the present invention incorporating a system 20 for levitating an exemplary vehicle 22, comprised of a locomotive 24 and cars 26, over a roadbed 28 and for guiding the vehicle along a longitudinal channel 30 in the roadbed.

A thin flexible permanent magnetic strip 32 is bonded to the bottom surface of each element (locomotive 24, cars 26) of the vehicle 22. A similar strip 34 is embedded in the roadbed 28 and forms the floor 35 of the channel 30. The strips 32, 34 are arranged with like magnetic poles adjacent thereby generating a repelling force therebetween. This repelling force causes the strip 32 and attached vehicle 22 to be levitated above the strip 34 and the roadbed 28.

Cylindrical pins 36 descend from the vehicle 22 to engage walls 37, defined by the channel 30, for guidance of the vehicle 22 therealong. Thus, movement of the vehicle 22 along the roadbed 28 is facilitated since the only restrictive force is the friction between the pins 36 and the channel walls 37.

The thin magnetic strips 32, 34 are preferably formed of flexible magnetic material, e.g. barium ferrite powder combined with thermoplastic binders, of the type commercially available from Magnetic Specialty, Inc. of Marietta, Ohio.

Figure 2:
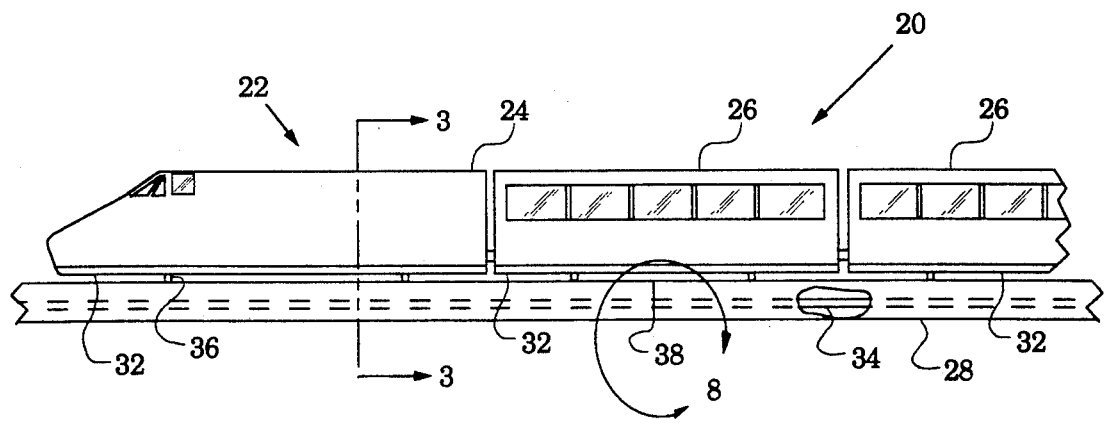
FIG. 2 is an elevation view of the system of FIG. 1.

FIG. 2 is an elevation view of the system 20 illustrating that a pair of the pins 36 are disposed on each element (locomotive 24 and cars 26) of the vehicle 22. The roadbed 28 is constructed in sections which meet along partition lines 38 as shown in the area within the line 8. A portion of the roadbed 28 is broken away to show the strip 34.

Figure 3:
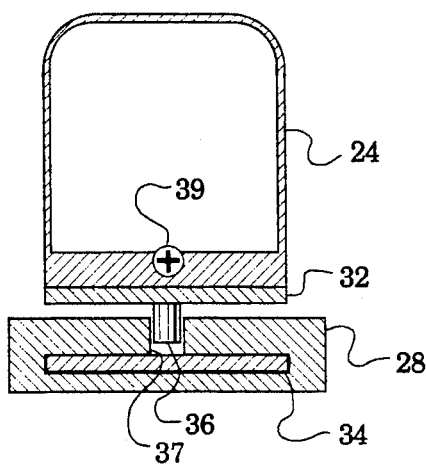
FIG. 3 is a sectional view along the line 3—3 of FIG. 2.

FIG. 3 is a view along the plane 3—3 of FIG. 2 showing the locomotive 24 configured with a hollow upper interior portion to create a low center of gravity 39 which is represented by a bold cross within a circle. The cars 26 are similarly configured. The low center of gravity enhances the stability of the levitated vehicle 22. The width of the channel 30 is chosen to closely receive the pins 36 for smooth guidance of the vehicle 22 therealong and yet prevent binding of the pins 36 which would restrict free movement of the vehicle 22.

As shown in FIGS. 1 and 3, the preferred system embodiment 20 is configured with the pins 36 and channel 30 centered relative to the vehicle 22 and roadbed 28. Other embodiments wherein the channel 30 is off-center or wherein more than one channel is employed may be used without departing from the spirit of the invention.

Figure 4:
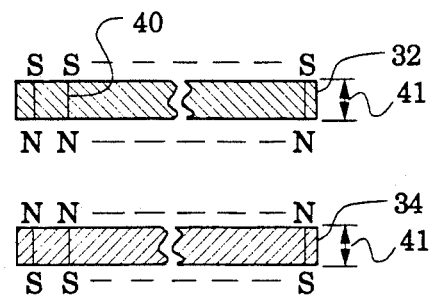
FIG. 4 is an enlarged view of the magnetic strips of FIG. 3.

FIG. 4 is an enlarged view of the preferred magnetic strips 32, 34 of FIG. 3 illustrating the magnetic dipoles 40 arranged parallel with the thin dimension 41 of the strips and with the strips arranged with like poles adjacent to create the repelling force. FIG. 4 shows north magnetic poles of the strips 32, 34 adjacent but the adjacent like poles, of course, could also be the south magnetic poles.

Figure 5:
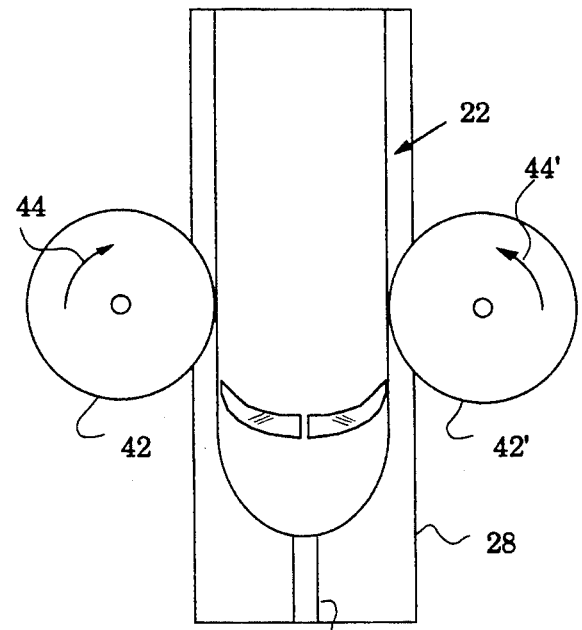
FIG. 5 is a plan view of the propulsion apparatus of the system of FIG. 1.
Figure 6:
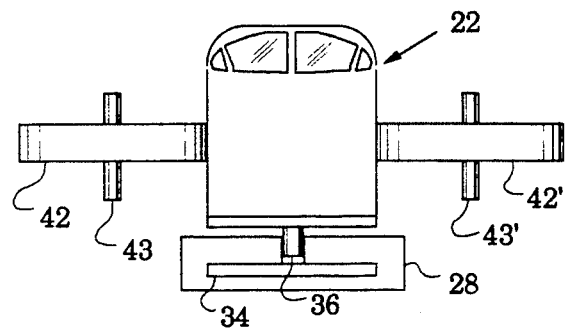
FIG. 6 is an elevation view of the apparatus of FIG. 5.

FIG. 5 is a plan view and FIG. 6 an elevation view of the preferred propulsion apparatus used in the system 20 of FIG. 1. FIGS. 5 and 6 illustrate a pair of wheels 42, 42' which rotate on axles 43, 43' in directions indicated by the arrows 44, 44' to contact the sides of the vehicle 22 as it passes over the roadbed 28. The wheels 42, 42' are of a soft foam-like material which imparts a propelling force to the vehicle 22 as it passes by.

Figure 7:
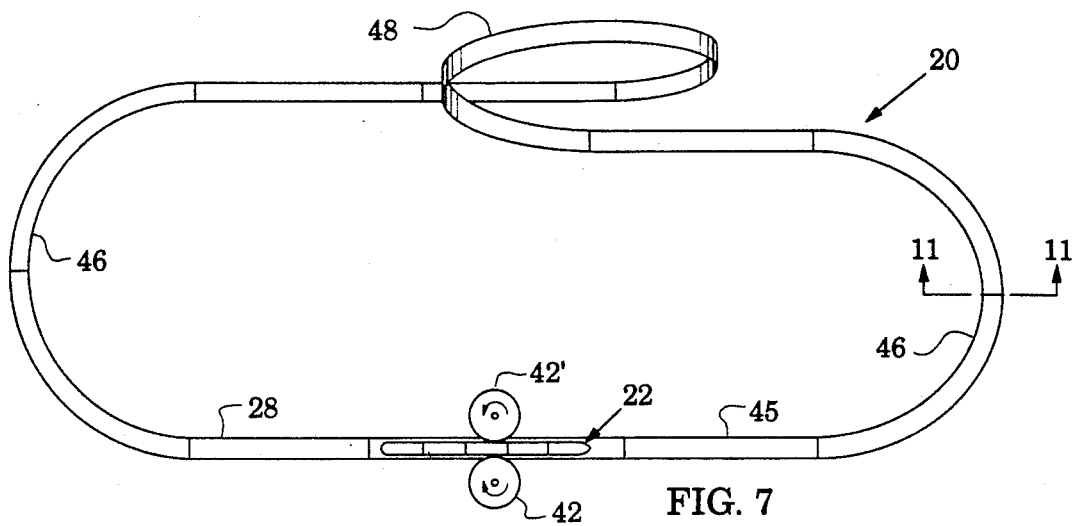
FIG. 7 is a plan view of the system of FIG. 1.

FIG. 7 is a plan view of the system 20 of FIG. 1 illustrating a typical layout configuration of the roadbed 28, the vehicle 22 and the propulsion apparatus of FIGS. 5 and 6 with its wheels 42, 42'. The roadbed 28 is comprised of sections 45 and may include turns 46 and vertical loops 48.

Figure 8:
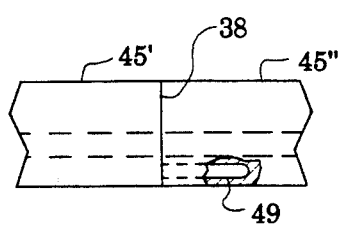
FIG. 8 is an enlarged view of the area enclosed by the line 8 of FIG. 2.
Figure 9:
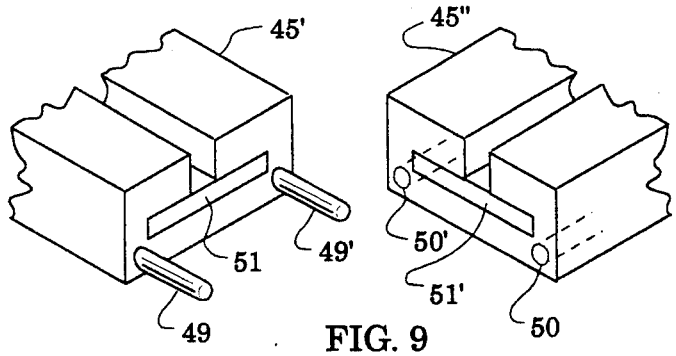
FIG. 9 is an exploded view of the elements in FIG. 8.

FIG. 8 is an enlarged view of the area within the line 8 of FIG. 2 illustrating two abutted sections 45', 45'' of the roadbed 28 which meet at a transverse partition line 38. FIG. 9 is a view, exploded about the partition line 38, of the same sections 45', 45'' showing that the section 45' ends with a pair of pegs 49, 49' that are closely received in a pair of holes 50, 50' in the adjacent end of the section 45''. When the sections 45', 45'' are pressed together, as in FIG. 8, the ends 51, 51' of the magnetic strips abut over their entire end surface.

Figure 10:
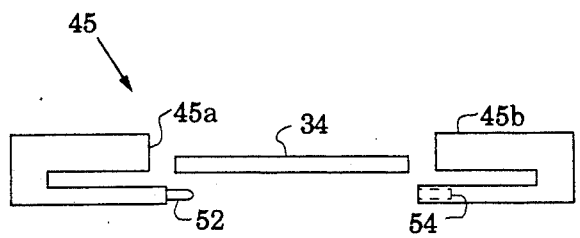
FIG. 10 is an exploded view of one of the elements of FIG. 9.
Figure 11:
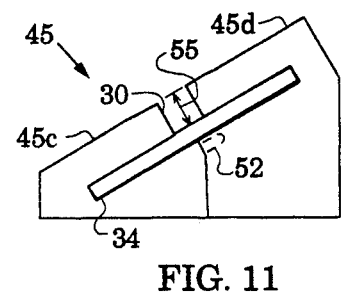
FIG. 11 is a view along the line 11—11 of FIG. 7.

FIG. 10 is a view of a roadbed section 45 (e.g. the sections 45', 45'' of FIG. 9) exploded about its longitudinal axis, showing that a section 45 may be comprised of two parts 45a, 45b which are joined, around the magnetic strip 34, with the aid of pegs 52 which engage holes 54. FIG. 11 is a view along the plane 11—11 of FIG. 7 illustrating similar construction of a section 45 along a turn (46 in FIG. 7) of the system 20. Parts 45c and 45d are joined with the aid of pegs 52 in a manner similar to that described in FIGS. 8, 9 relative to the pegs 49, 49'. The depth, indicated by the arrow 55, of the channel 30 may be increased on turns of the roadbed (28 in FIG. 7) to maintain engagement of the pins (36 in FIG. 3) with the channel walls 37.

Successful operation of the system 20 illustrated in FIGS. 1 through 11 is enhanced by control of several parameters. These parameters, which can be understood by reference particularly to FIGS. 2, 3 and 11, include transverse alignment of the magnetic strip in the roadbed (34 and 28 in FIG. 3), transverse alignment of the channel (30 in FIG. 3) with the roadbed, transverse alignment of the pins in the vehicle (36 and 22 in FIG. 3), longitudinal position of the pins on each element (24, 26 in FIG. 2) of the vehicle, length of the pins relative to the depth (55 in FIG. 11) of the channel, coefficient of friction between the pins and the channel, location of the vehicle center of gravity (39 in FIG. 3), weight of the vehicle, and contact between magnetic strip ends (51, 51' in FIG. 9) in adjacent roadbed sections.

For such control it is desirable to transversly align the magnetic strips 32, 34, the pins 36, the channel 30 and the vehicle center of gravity 39. The longitudinal position of the pins 36 on each element 24, 26 is a compromise between placing them farther apart to optimize performance in the vertical loop 48 and moving the front pin farther back to obtain a smoother ride along the roadbed 28.

The pins 36 should have a length below the vehicle 20 equal to or slightly less than the channel depth 55. The channel depth 55, as mentioned above, may, depending on factors such as the degree of bank and vehicle speed, be increased slightly in turns 46 of the roadbed 28. The channel 30 should be maintained perpendicular to the roadbed surface in the turns 46. The coefficient of friction between the pins 36 and the channel 30 should be minimized to reduce drag. The vehicle center of gravity 39 should be located low in the vehicle 22. The weight of the vehicle 22 may be adjusted experimentally in relation to the pin length and the magnetic field strength of the magnetic strips 32, 34. It is desirable to establish good contact between the end surfaces 50, 50' of the magnetic strip 34 in adjoining roadbed sections 45 to assure continuity of the repelling magnetic field between strips 32 and 34.

Figure 12:
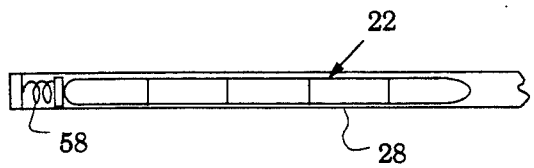
FIG. 12 is a plan view of another preferred embodiment of a propulsion apparatus in accordance with the present invention.
Figure 13:
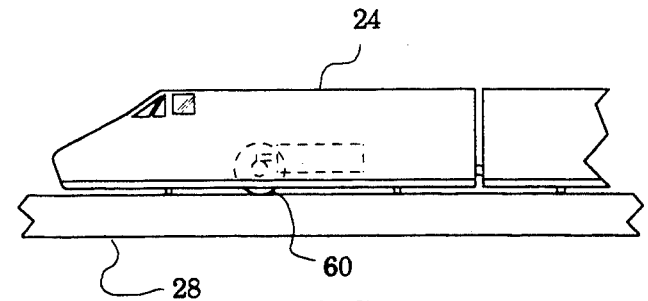
FIG. 13 is an elevation view of another preferred embodiment of a propulsion apparatus in accordance with the present invention.
Figure 14:
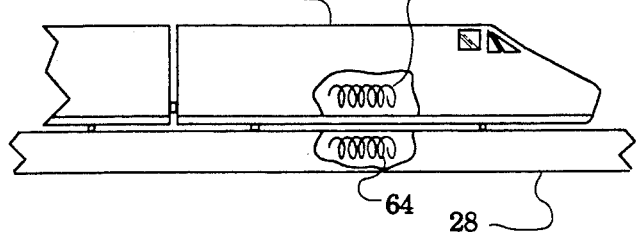
FIG. 14 is an elevation view of another preferred embodiment of a propulsion apparatus in accordance with the present invention.

FIGS. 12, 13 and 14 illustrate other preferred propulsion embodiments in accordance with the invention. FIG. 12 shows a compressed spring 58 to urge the vehicle 22 along the roadbed 28. FIG. 13 shows a motor driven wheel 60, in the locomotive 24, which contacts the roadbed 28 for propelling the vehicle thereby. FIG. 14 illustrates a current carrying coil 62, in the locomotive 24, in magnetic communication with a magnetic field, set up by a coil 64 in the roadbed 28, which induces a driving force in the coil 62. The magnetic field established by the coil 64 could equivalently be established by a permanent magnet.

From the foregoing it should be now be recognized that a levitation and guidance system has been disclosed herein utilizing thin permanently magnetized strips for levitating a vehicle above a roadbed and pins for guiding the vehicle along a channel of the roadbed. Although the present invention has been described with reference to preferred embodiments, numerous modifications and rearrangements can be made with the equivalent result still embraced within the scope of the invention.

What is claimed is:

1. In combination with a vehicle and a roadbed having a surface, a system for facilitating movement of said vehicle along said roadbed surface, the system comprising:

a first thin magnetic strip mounted on said vehicle, said first strip permanently magnetized parallel to its thin dimension;

a second thin magnetic strip disposed beneath said roadbed surface and extending therealong, said second strip permanently magnetized parallel to its thin dimension;

said vehicle being disposed on said roadbed surface with said first and second strips extending substantially parallel to and in alignment with one another, said first and second strips being oriented with like magnetic poles adjacent to thereby levitate said vehicle above said roadbed surface;

propulsion means for propelling said vehicle;

guidance means for guiding said vehicle along said roadbed surface, said guidance means including first and second spaced walls extending from said surface into said roadbed to form a longitudinal channel aligned between said first and second strips; and a plurality of pins descending from said vehicle to engage said walls for guidance therealong to maintain said vehicle over said roadbed surface in a visually observable vertically spaced relationship.

2. A system as defined in claim 1 wherein said pins are headless.

3. A system as defined in claim 2 wherein said pins are cylindrical.

4. A system as defined in claim 1 wherein said first magnetic strip is mounted along the bottom surface of said vehicle.

5. A system as defined in claim 1 wherein said first and second strip each comprise a flexible plastic.

6. A system as defined in claim 1 wherein said channel is substantially centered relative to said roadbed.

7. A system as defined in claim 1 wherein said propelling means comprises a wheel disposed adjacent to said roadbed to rotatably contact said vehicle for propulsion thereof.

8. A system as defined in claim 1 wherein said propelling means comprises a spring disposed adjacent said roadbed to urge said vehicle along said roadbed.

9. A system as defined in claim 1 wherein said propelling means comprises:

a wheel rotatably disposed within said vehicle to contact said roadbed; and a motor disposed in said vehicle to rotate said wheel.

10. A system as defined in claim 1 wherein said propelling means comprises:

a current carrying coil disposed within said vehicle; and a magnetic field disposed along said roadbed for magnetic communication with said coil thus inducing a force therein.

* * * * *